United States Patent
Park et al.

(10) Patent No.: US 10,745,554 B2
(45) Date of Patent: Aug. 18, 2020

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Young Ho Park, Uiwang-si (KR); So Hyang Shin, Uiwang-si (KR); Hyuk Jin Jeong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 16/233,151

(22) Filed: Dec. 27, 2018

(65) Prior Publication Data

US 2019/0203041 A1    Jul. 4, 2019

(30) Foreign Application Priority Data

Dec. 29, 2017  (KR) .................. 10-2017-0184704

(51) Int. Cl.

| | |
|---|---|
| *C08L 69/00* | (2006.01) |
| *C08L 33/12* | (2006.01) |
| *C08K 3/40* | (2006.01) |
| *C08K 5/5399* | (2006.01) |
| *C08K 5/00* | (2006.01) |
| *C08K 7/14* | (2006.01) |

(52) U.S. Cl.
CPC ............... *C08L 69/00* (2013.01); *C08K 3/40* (2013.01); *C08L 33/12* (2013.01); *C08K 5/0066* (2013.01); *C08K 5/5399* (2013.01); *C08K 7/14* (2013.01); *C08L 2201/02* (2013.01)

(58) Field of Classification Search
CPC .................. C08L 69/00; C08K 3/40
See application file for complete search history.

(56) References Cited

U.S. PATENT DOCUMENTS

2007/0072995 A1* 3/2007 Kang ................. C08L 23/0869
                                                                525/92 E
2015/0307705 A1  10/2015 Jung et al.

FOREIGN PATENT DOCUMENTS

| JP | 2015-059138 A | 3/2015 |
|---|---|---|
| KR | 10-1035116 B1 | 5/2011 |
| KR | 10-2015-0093747 A | 8/2015 |

OTHER PUBLICATIONS

Machine translation of JP2015059138 (Year: 2015).*
Office Action in counterpart Korean Application No. 10-2017-0184704 dated Dec. 23, 2019, pp. 1-5.

* cited by examiner

*Primary Examiner* — Wenwen Cai
(74) *Attorney, Agent, or Firm* — Additon, Higgins & Pendleton, P.A.

(57) ABSTRACT

Disclosed herein is a thermoplastic resin composition. The thermoplastic resin composition includes: about 100 parts by weight of a polycarbonate resin; about 20 parts by weight to about 130 parts by weight of flat glass fibers coated with an epoxy compound; about 0.5 parts by weight to about 3 parts by weight of a modified polyolefin including a repeat unit represent by Formula 1 and a repeat unit represented by Formula 2; about 5 parts by weight to about 20 parts by weight of a phosphazene compound; and about 0.1 parts by weight to about 5 parts by weight of a fluorinated olefin resin. The thermoplastic resin composition has good properties in terms of impact resistance, rigidity, and/or flame retardancy.

8 Claims, No Drawings

THERMOPLASTIC RESIN COMPOSITION AND ARTICLE PRODUCED THEREFROM

CROSS-REFERENCE TO RELATED APPLICATION

This application claims priority, under 35 USC Section 119, to and the benefit of Korean Patent Application No. 10-2017-0184704, filed Dec. 29, 2017, the entire disclosure of which is incorporated herein by reference.

FIELD

The present disclosure relates to a thermoplastic resin composition and a molded article formed of the same.

BACKGROUND

Thermoplastic resins are useful as materials for housings of electric/electronic products, interior/exterior materials for automobiles, and exterior materials for buildings due to lower specific gravity than glass or metal and good properties in terms of moldability and impact resistance. Particularly, with a trend toward larger and lighter electric/electronic products, plastic products manufactured using thermoplastic resins are rapidly replacing glass or metal products.

Recently, with reduction in thickness and weight of portable electronic products manufactured using a thermoplastic resin composition, the thermoplastic resin composition is required to secure both high impact strength and high rigidity in order to prevent damage to the products due to external impact or the like. However, there is a tradeoff between rigidity and impact resistance, causing a limitation in simultaneously realizing high rigidity and high impact resistance.

Although various inorganic or organic flame retardants have been used to improve flame retardancy of thermoplastic resin compositions, use of an excess of such flame retardants can cause deterioration in impact resistance.

Therefore, there is a need for a thermoplastic resin composition which has good properties in terms of impact resistance, rigidity, flame retardancy, and balance therebetween.

SUMMARY OF THE INVENTION

The present disclosure relates to a thermoplastic resin composition which can have good properties in terms of impact resistance, rigidity, and/or flame retardancy, and a molded article manufactured using the same.

The thermoplastic resin composition includes: about 100 parts by weight of a polycarbonate resin; about 20 parts by weight to about 130 parts by weight of flat glass fibers coated with an epoxy compound; about 0.5 parts by weight to about 3 parts by weight of a modified polyolefin including a repeat unit represent by Formula 1 and a repeat unit represented by Formula 2; about 5 parts by weight to about 20 parts by weight of a phosphazene compound; and about 0.1 parts by weight to about 5 parts by weight of a fluorinated olefin resin,

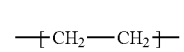

[Formula 1]

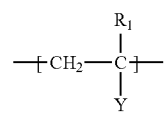

[Formula 2]

where $R_1$ is a hydrogen atom or a methyl group, and Y is —$COOR_2$ ($R_2$ being a $C_1$ to $C_{12}$ alkyl group), a glycidyl-modified ester group, an arylate group, or a nitrile group.

The glass fibers may be flat chop-strand glass fibers coated with an epoxy group-containing compound and having a cross-sectional aspect ratio of about 2 to about 6.

The modified polyolefin may include about 50 wt % to about 95 wt % of the repeat unit represented by Formula 1 and about 5 wt % to about 50 wt % of the repeat unit represented by Formula 2.

The phosphazene compound may be a compound represented by Formula 3:

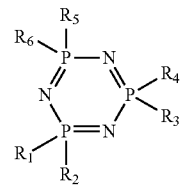

[Formula 3]

wherein $R_1$, $R_2$, $R_3$, $R_4$, $R_5$, and $R_6$ are each the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group. The fluorinated olefin resin may include polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, and/or a mixture obtained by aggregating a polytetrafluoroethylene emulsion with a styrene-acrylonitrile emulsion.

A weight ratio of the glass fibers to the modified polyolefin may range from about 15:1 to about 60:1.

The thermoplastic resin composition may have a notched Izod impact strength of about 10 kgf·cm/cm to about 20 kgf·cm/cm, as measured on a ⅛" thick specimen in accordance with ASTM D256.

The thermoplastic resin composition may have a flexural strength of about 55,000 kgf/cm² to about 165,000 kgf/cm², as measured on a 3.2 mm thick specimen at a flexural rate of 2.8 mm/min in accordance with ASTM D790.

The thermoplastic resin composition may have a flame retardancy of V-0 or higher, as measured on a 0.75 mm or 1.0 mm thick specimen by the UL-94 vertical burning test.

The present disclosure also relates to a molded article. The molded article is formed of the thermoplastic resin composition set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present invention includes: (A) a polycarbonate resin; (B) glass fibers; (C) a modified polyolefin; (D) a phosphazene compound; and (E) a fluorinated olefin resin.

(A) Polycarbonate Resin

The polycarbonate resin may include any typical polycarbonate resin used in thermoplastic resin compositions. For example, the polycarbonate resin may be an aromatic polycarbonate resin prepared by reacting diphenol(s) (aromatic diol compounds) with a precursor, such as phosgene, halogen formate, and/or carbonic diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl)propane, without being limited thereto. For example, the diphenols may be 2,2-bis-(4-hydroxyphenyl)propane, 2,2-bis(3,5-dichloro-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may be a branched polycarbonate resin. The branched polycarbonate resin may prepared by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good properties in terms of fluidity (processability).

The polycarbonate resin may have a melt-flow index (MI) of about 5 g/10 min to about 80 g/10 min, as measured at 300° C. under a load of 1.2 kg in accordance with ISO 1133. In addition, the polycarbonate resin may be a mixture of two or more polycarbonate resins having different melt-flow indices.

(B) Glass Fibers

The glass fibers can improve rigidity of the thermoplastic resin composition with minimal or no deterioration in impact resistance when present in high quantity in the thermoplastic resin composition and may include flat glass fibers coated with an epoxy compound.

The glass fibers may have a cross-sectional aspect ratio (ratio of major diameter to minor diameter in cross-section) of about 2 to about 6, as measured using an optical microscope, a minor diameter of about 2 to about 10 μm, and a length before processing of about 2 mm to about 5 mm. In addition, the glass fibers may be flat chop-strand glass fibers coated with an epoxy group-containing compound. Herein, the term "cross-sectional aspect ratio" refers to a ratio of major diameter to minor diameter of the glass fibers in cross-section.

The epoxy compound is a surface-treatment agent (sizing agent) and may include an epoxy group-containing compound. In actual use, the surface treatment agent may further include components other than the epoxy compound, such as a urethane compound. Examples of the epoxy compound may include without limitation polyfunctional epoxy compounds containing at least one epoxy group, for example bisphenol-type epoxy compounds, novolac-type epoxy compounds, polyglycidyl ester compounds, alicyclic epoxy compounds, glycidyl ether compounds, and/or epoxy group-containing copolymers.

The thermoplastic resin composition can include the glass fibers (B) in an amount of about 20 parts by weight to about 130 parts by weight, for example, about 25 parts by weight to about 125 parts by weight, and as another example about 70 parts by weight to about 120 parts by weight, relative to about 100 parts by weight of the polycarbonate resin (A). In some embodiments, the thermoplastic resin composition can include the glass fibers (B) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, or 130 parts by weight based on about 100 parts by weight of the polycarbonate resin (A). Further, according to some embodiments, the glass fibers may be present in an amount of from about any of the foregoing amounts to about any other of the foregoing amounts.

If the amount of the glass fibers is less than about 20 parts by weight, the thermoplastic resin composition can have poor properties in terms of rigidity and/or impact resistance, whereas, if the amount of the glass fibers exceeds about 130 parts by weight, the thermoplastic resin composition can have poor properties in terms of extrudability and/or injection moldability.

(C) Modified Polyolefin

The modified polyolefin can improve the impact resistance, flame retardancy and/or rigidity of the thermoplastic resin composition while minimizing deterioration in fluidity and may have a structure in which a functional group (an alkyl carboxylate group, a glycidyl-modified ester group, an arylate group, and/or a nitrile group) is grafted to a polyolefin as a main chain. For example, the modified polyolefin may include a repeat unit represent by Formula 1 and a repeat unit represented by Formula 2:

[Formula 1]

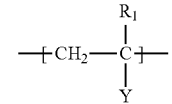

[Formula 2]

wherein in Formula 2, $R_1$ is a hydrogen atom or a methyl group and Y is —$COOR_2$ ($R_2$ being a $C_1$ to $C_{12}$ alkyl group), a glycidyl-modified ester group, an arylate group (for example C6 to C12 arylate group), or a nitrile group (—CN).

The modified polyolefin may be prepared by polymerizing an olefin with a $C_1$ to $C_{12}$ alkyl (meth)acrylate, ethylenically unsaturated group-containing modified ester, ethylenically unsaturated group-containing acrylate, and/or (meth)acrylonitrile.

The modified polyolefin may include about 50 wt % to about 95 wt %, for example, about 70 wt % to about 93 wt %, of the repeat unit represented by Formula 1 and about 5 wt % to about 50 wt %, for example, about 7 to about 30 wt %, of the repeat unit represented by Formula 2.

In some embodiments, the modified polyolefin can include the repeat unit represented by Formula 1 in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % based on the total weight (100 wt %) of the modified polyolefin. Further, according to some embodiments, the repeat unit represented by Formula 1 may be present in an amount of from about any of the foregoing amounts to about any other of the foregoing amounts.

In some embodiments, the modified polyolefin can include the repeat unit represented by Formula 2 in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on the total weight (100 wt %) of the modified polyolefin. Further, according to some embodiments, the repeat unit represented by Formula 2 may be present in an amount of from about any of the foregoing amounts to about any other of the foregoing amounts.

Within these ranges, the thermoplastic resin can have good properties in terms of impact resistance, compatibility, and/or moldability.

The modified polyolefin may be a random copolymer, a block copolymer, a multi-block copolymer, or a combination thereof.

The modified polyolefin may have a melt-flow index of about 0.01 g/10 min to about 40 g/10 min, for example, about 0.1 g/10 min to about 10 g/10 min, as measure at 190° C. under a load of 2.16 kgf in accordance with ASTM D1238.

The thermoplastic resin composition can include the modified polyolefin (C) in an amount of about 0.5 parts by weight to about 3 parts by weight, for example, about 1 part by weight to about 2.2 parts by weight, relative to about 100 parts by weight of the polycarbonate resin (A). In some embodiments, the thermoplastic resin composition can include the modified polyolefin (C) in an amount of about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 parts by weight, relative to about 100 parts by weight of the polycarbonate resin (A). Further, according to some embodiments, the modified polyolefin (C) may be present in an amount of from about any of the foregoing amounts to about any other of the foregoing amounts.

If the amount of the modified polyolefin is less than about 0.5 parts by weight, the thermoplastic resin composition can have poor properties in terms of impact resistance, whereas, if the amount of the modified polyolefin exceeds about 3 parts by weight, the thermoplastic resin composition can have poor properties in terms of flame retardancy, rigidity, and/or heat resistance.

In exemplary embodiments, a weight ratio ((B):(C)) of the glass fibers (B) to the modified polyolefin (C) may range from about 15:1 to about 60:1, for example about 20:1 to about 55:1. In some embodiments, the weight ratio ((B):(C)) of the glass fibers (B) to the modified polyolefin (C) can be about 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1. 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, or 60:1. Within this range, the thermoplastic resin composition can have further improved properties in terms of impact resistance, rigidity, and balance therebetween.

(D) Phosphazene Compound

The phosphazene compound can improve flame retardancy of the thermoplastic resin composition with minimal or no deterioration in rigidity and/or impact resistance and may include any typical phosphazene compound used in flame retardant thermoplastic resin compositions.

In exemplary embodiments, the phosphazene compound may be a compound represented by Formula 3:

[Formula 3]

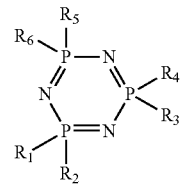

wherein $R_1$, $R_2$, $R_3$, $R_4$, $R_5$, and $R_6$ are each the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

As used herein, the term "substituted" means that a hydrogen atom in a functional group is substituted with a substituent, such as a $C_1$ to $C_{10}$ alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, and/or a combination thereof.

In addition, "alkyl", "alkoxy", and other substituted compounds containing "alkyl" include linear and/or branched compounds; "alkenyl" includes $C_2$ to $C_8$ linear and/or branched compounds containing at least one double bond; and "cycloalkyl" includes $C_3$ to $C_{20}$ saturated monocyclic and/or saturated bicyclic compounds. "Aryl" is an organic radical derived from an aromatic hydrocarbon by removing one hydrogen atom and includes a monocyclic and/or fused polycyclic ring system which contains 4 to 7, for example 5 to 6 cyclic atoms in each ring. Examples of the aryl may include phenyl, naphthyl, biphenyl, and/or tolyl, without being limited thereto.

"Heterocycloalkyl" refers to a cycloalkyl group which contains 1 to 3 heteroatoms selected from N, O, and/or S as a hydrocarbon backbone atom and contains carbon as remaining saturated monocyclic and/or bicyclic backbone atoms, and examples thereof may include pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, and/or azepanyl.

"Heteroaryl" refers to an aryl group which contains 1 to 3 heteroatoms selected from N, O, and/or S as an aromatic ring backbone atom and contains carbon as remaining aromatic ring backbone atoms. The heteroaryl group includes a divalent aryl group in which heteroatoms in a ring are oxidized and/or quaternized to form, for example, N-oxides and/or quaternary salts. Examples of the heteroaryl may include furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazenyl, triazolyl, tetrazolyl, furazanyl, pyridyl, pyrazinyl, pyrimidinyl, and/or pyridazinyl, without being limited thereto.

In exemplary embodiments, the phosphazene compound may include a compound represented by Formula 3a, a compound represented by Formula 3b, and/or a compound represented by Formula 3c:

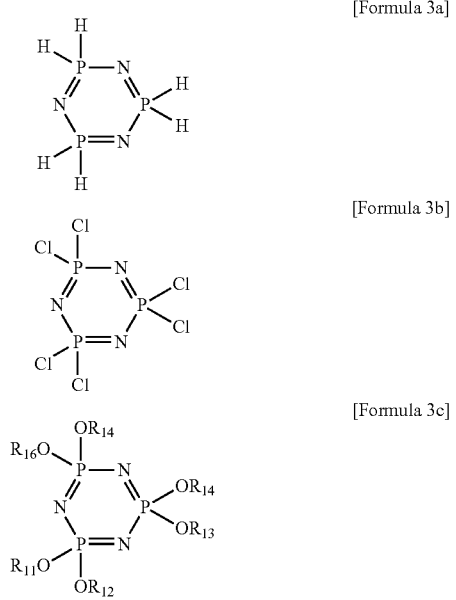

wherein $R_{11}$, $R_{12}$, $R_{13}$, $R_{14}$, $R_{15}$, and $R_{16}$ are the same or different and are each independently a hydrogen atom, a $C_1$ to $C_6$ alkyl group, a phenyl group, or a benzyl group.

The thermoplastic resin composition can include the phosphazene compound (D) in an amount of about 5 parts by weight to about 20 parts by weight, for example, about 8 parts by weight to about 16 parts by weight, relative to about 100 parts by weight of the polycarbonate resin (A). In some embodiments, the thermoplastic resin composition can include the phosphazene compound (D) in an amount of about 5, 6, 7, 8, 9, 10, 11, 12, 13, 14, 15, 16, 17, 18, 19, or 20 parts by weight relative to about 100 parts by weight of the polycarbonate resin (A). Further, according to some embodiments, the phosphazene compound (D) may be present in an amount of from about any of the foregoing amounts to about any other of the foregoing amounts.

If the amount of the phosphazene compound is less than about 5 parts by weight, the thermoplastic resin composition can have poor flame retardancy, whereas, if the amount of the phosphazene compound exceeds about 20 parts by weight, the thermoplastic resin composition can have poor properties in terms of impact resistance and/or heat resistance.

(E) Fluorinated Olefin Resin

The fluorinated olefin resin forms a fibrillar network in the thermoplastic resin composition when the resin composition is subjected to extrusion, such that, when burnt, the resin composition can exhibit reduced melt viscosity and increased shrinkage rate to be prevented from dripping. Examples of the fluorinated olefin resin may include without limitation polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, a mixture obtained by aggregating a polytetrafluoroethylene emulsion with a styrene-acrylonitrile emulsion, and combinations thereof. For example, the fluorinated olefin resin may be polytetrafluoroethylene (trade name: Teflon) having an average particle size of about 0.05 μm to about 1,000 μm and a specific gravity of about 1.2 g/cm$^3$ to about 2.3 g/cm$^3$ or a mixture obtained by aggregating a polytetrafluoroethylene emulsion with a styrene-acrylonitrile emulsion.

The fluorinated olefin resin may be prepared by any known polymerization method. For example, the fluorinated olefin resin may be prepared in an aqueous medium containing a free radical-forming catalyst such as sodium, potassium, and/or ammonium peroxydisulfate. In addition, the fluorinated olefin resin may be provided in emulsion form and/or powder form.

The thermoplastic resin composition can include the fluorinated olefin resin (E) in an amount of about 0.1 parts by weight to about 5 parts by weight, for example, about 0.5 parts by weight to about 3 parts by weight, relative to about 100 parts by weight of the polycarbonate resin (A). In some embodiments, the thermoplastic resin composition can include the fluorinated olefin resin (E) in an amount of about 0.1, 0.2, 0.3, 0.4, 0.5, 0.6, 0.7, 0.8, 0.9, 1, 2, 3, 4, or 5 parts by weight relative to about 100 parts by weight of the polycarbonate resin (A). Further, according to some embodiments, the fluorinated olefin resin (E) may be present in an amount of from about any of the foregoing amounts to about any other of the foregoing amounts.

If the amount of the fluorinated olefin resin is less than about 0.1 parts by weight, the thermoplastic resin composition can have poor flame retardancy, whereas, if the amount of the fluorinated olefin resin exceeds about 5 parts by weight, the thermoplastic resin composition can have poor properties in terms of moldability and/or appearance quality of products formed thereof.

The thermoplastic resin composition may optionally further include one or more of any typical additive used in thermoplastic resin compositions. Examples of the additive may include without limitation a lubricant, an antioxidant, a release agent, a stabilizer, a dye, a pigment, and combinations thereof. The additive may be present in an amount of about 0.001 to about 40 parts by weight, for example, about 0.1 to about 10 parts by weight, relative to about 100 parts by weight of the polycarbonate resin (A).

The thermoplastic resin composition according to the present invention may be prepared in pellet form by mixing the aforementioned components, followed by melt extrusion at a temperature of about 200° C. to about 280° C., for example, about 220° C. to about 250° C. using a typical twin screw extruder.

The thermoplastic resin composition may have a notched Izod impact strength of about 10 kgf·cm/cm to about 20 kgf·cm/cm, for example, about 12 kgf·cm/cm to about 18 kgf·cm/cm, as measured on a ⅛" thick specimen in accordance with ASTM D256.

The thermoplastic resin composition may have a flexural strength of about 55,000 kgf/cm$^2$ to about 165,000 kgf/cm$^2$, for example, about 60,000 kgf/cm$^2$ to about 155,000 kgf/cm$^2$, as measured on a 3.2 mm thick specimen at a flexural rate of 2.8 mm/min in accordance with ASTM D790.

The thermoplastic resin composition may have a flame retardancy of V-0 or higher, as measured on a 0.75 mm or 1.0 mm thick specimen by the UL-94 vertical burning test.

A molded article according to the present invention is formed of the thermoplastic resin composition set forth above. For example, the thermoplastic resin composition may be produced into the molded article by any suitable molding method such as injection molding, extrusion, vacuum molding, or casting. Such molding methods are well known to those skilled in the art to which the present invention pertains. The molded article may be useful as an interior/exterior material for electric/electronic products but is not limited thereto, due to good properties in terms of impact resistance, rigidity, flame retardancy, and balance therebetween. For example, the molded article may be used as an interior/exterior material for mobile phones, laptops, and the like.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Polycarbonate resin

A bisphenol-A polycarbonate resin having a weight average molecular weight (Mw) of 25,000 g/mol (B) Glass fibers (B1) Flat chop-strand glass fibers coated with an epoxy compound and a urethane compound (CSG 3PA-832, Nitto Boseki Co., Ltd., minor diameter in cross-section: 7 μm, cross-sectional aspect ratio: 4, length before processing: 3 mm)

(B2) Flat chop-strand glass fibers coated with a urethane compound (CSG 3PA-820, Nitto Boseki Co., Ltd., minor diameter in cross-section: 7 μm, cross-sectional aspect ratio: 4, length before processing: 3 mm)

(B3) Round chop-strand glass fibers (CSF3PE-936SD, Nitto Boseki Co., Ltd., diameter in cross-section: 13.5 μm, cross-sectional aspect ratio: 1, length before processing: 3 mm)

(B4) Round chop-strand glass fibers coated with an epoxy compound (CS321-EC10-3, KCC GLASS FIBER, diameter in cross-section: 10 μm, cross-sectional aspect ratio: 1, length before processing: 3 mm)

(C) Impact modifier (C1) Modified polyolefin (ethylene/alkyl (meth)acrylate copolymer) (Elvaloy AC1330, Dupont)

(C2) A g-ABS copolymer obtained by grafting 55 wt % of styrene and acrylonitrile (weight ratio: 71/29) to 45 wt % of polybutadiene rubber (PBR) having an average (Z-average) particle size of 310 nm (D) Flame retardant (D1) A phosphazene Compound (a cyclic phenoxyphosphazene oligomer) (Rabitle FP 110, Fushimi Pharmaceutical Co., Ltd.)

(D2) Bisphenol-A diphosphate (YOKE-BDP, Yoke Chemical)

(E) Fluorinated olefin resin

A mixture obtained by aggregating a polytetrafluoroethylene emulsion with a styrene-acrylonitrile emulsion (TS 30A, PACIFIC InterChem Co., Ltd.)

Example 1 to 5 and Comparative Example 1 to 7

The aforementioned components are mixed in amounts as listed in Tables 1 and 2, followed by extrusion at 270° C., thereby preparing a thermoplastic resin composition in pellet form. Here, extrusion is performed using a twin-screw extruder (L/D: 36, Φ: 45 mm). The prepared pellets are dried at 80° C. for 2 hours or more and then subjected to injection molding using a 6 oz. injection machine (molding temperature of 270° C., a mold temperature: 90° C.), thereby preparing a specimen. The prepared specimen is evaluated as to the following properties. Results are shown in Tables 1 and 2.

Property Evaluation (1) Impact resistance: Notched Izod impact strength (unit: kgf·cm/cm) is measured on a ⅛" thick Izod specimen in accordance with ASTM D256 wherein the specimens are prepared under the injection molding conditions noted above.

(2) Rigidity: Flexural strength (unit: kgf/cm$^2$) is measured on a 3.2 mm thick specimen at a flexural rate of 2.8 mm/min in accordance with ASTM D790 wherein the specimens are prepared under the injection molding conditions noted above.

(3) Flame retardancy: Flame retardancy is measured on a 0.75 mm or 1.0 mm thick specimen by the UL-94 vertical burning test wherein the specimens are prepared to under the injection molding conditions noted above. Here, when the amount of the glass fibers is less than 49 parts by weight relative to 100 parts by weight of the polycarbonate resin, flame retardancy of a 0.75 mm thick specimen is measured, and, when the amount of the glass fibers is greater than or equal to 49 parts by weight, flame retardancy of a 1.0 mm thick specimen was measured.

TABLE 1

|  |  | Example | | | | |
|---|---|---|---|---|---|---|
|  |  | 1 | 2 | 3 | 4 | 5 |
| (A) (parts by weight) |  | 100 | 100 | 100 | 100 | 100 |
| (B) (parts by weight) | (B1) | 25 | 120 | 25 | 120 | 80 |
|  | (B2) | — | — | — | — | — |
|  | (B3) | — | — | — | — | — |
|  | (B4) | — | — | — | — | — |

TABLE 1-continued

|  |  | \multicolumn{5}{c}{Example} |
| --- | --- | --- | --- | --- | --- | --- |
|  |  | 1 | 2 | 3 | 4 | 5 |
| (C) (parts by weight) | (C1) | 1.3 | 2.2 | 1 | 2.5 | 1.8 |
|  | (C2) | — | — | — | — | — |
| (D) (parts by weight) | (D1) | 8.5 | 15.5 | 8.5 | 15.5 | 12.5 |
|  | (D2) | — | — | — | — | — |
| (E) (parts by weight) |  | 0.6 | 2.6 | 0.6 | 2.6 | 0.9 |
| Notched Izod strength |  | 14.5 | 15 | 14 | 15.5 | 14.5 |
| Flexural strength |  | 60,000 | 145,000 | 61,000 | 140,000 | 80,000 |
| Flame retardancy (0.75 mm) |  | V-0 | — | V-0 | — | — |
| Flame retardancy (1.0 mm) |  | — | V-0 | — | V-0 | V-0 |

TABLE 2

|  |  | \multicolumn{7}{c}{Comparative Example} |
| --- | --- | --- | --- | --- | --- | --- | --- | --- |
|  |  | 1 | 2 | 3 | 4 | 5 | 6 | 7 |
| (A) (parts by weight) |  | 100 | 100 | 100 | 100 | 100 | 100 | 100 |
| (B) (parts by weight) | (B1) | — | — | — | 120 | 120 | 120 | 120 |
|  | (B2) | 120 | — | — | — | — | — | — |
|  | (B3) | — | 120 | — | — | — | — | — |
|  | (B4) | — | — | 120 | — | — | — | — |
| (C) (parts by weight) | (C1) | 2.2 | 2.2 | 2.2 | 0.1 | 4 | — | 2.2 |
|  | (C2) | — | — | — | — | — | 2.2 | — |
| (D) (parts by weight) | (D1) | 15.5 | 15.5 | 15.5 | 15.5 | 15.5 | 15.5 | — |
|  | (D2) | — | — | — | — | — | — | 15.5 |
| (E) (parts by weight) |  | 2.6 | 2.6 | 2.6 | 2.6 | 2.6 | 2.6 | 2.6 |
| Notched Izod strength |  | 9 | 5 | 8 | 4 | 18 | 8 | 11 |
| Flexural strength |  | 125,000 | 60,000 | 80,000 | 125,000 | 130,000 | 123,000 | 100,000 |
| Flame retardancy (1.0 mm) |  | V-0 | V-1 | V-1 | V-0 | V-1 | V-1 | V-1 |

From the results shown in Tables 1 and 2, it can be seen that the thermoplastic resin composition according to the present invention exhibit good properties in terms of impact resistance, rigidity, and flame retardancy.

Conversely, the thermoplastic resin composition of Comparative Example 1, in which the glass fibers (B2) are used instead of the glass fibers (B1) according to the present invention, has poor impact resistance and exhibits lower rigidity (flexural strength) than the thermoplastic resin composition of Example 2 having the same glass fiber content. The thermoplastic resin composition of Comparative Example 2 using the glass fibers (B3) and the thermoplastic resin composition of Comparative Example 3 using the glass fibers (B4) have poor impact resistance and exhibit much lower rigidity (flexural strength) than the thermoplastic resin composition of Example 2 having the same glass fiber content. The thermoplastic resin composition of Comparative Example 4, in which the amount of the modified polyolefin (C1) is below the range set forth herein, exhibits poor impact resistance, and the thermoplastic resin composition of Comparative Example 5, in which the amount of the modified polyolefin (C1) is above the range set forth herein, exhibits poor flame retardancy and has lower rigidity than the thermoplastic resin composition of Example 2. The thermoplastic resin composition of Comparative Example 6, in which the g-ABS (C2) is used instead of the modified polyolefin (C1) according to the present invention, exhibits poor properties in terms of impact resistance and flame retardancy and has lower rigidity (flexural strength) than the thermoplastic resin composition of Example 2 having the same impact modifier content, and the thermoplastic resin composition of Comparative Example 7, in which the bisphenol-A diphosphate (D2) is used instead of the phosphazene compound (D1) according to the present invention, has poor flame retardancy and exhibits lower rigidity (flexural strength) than the thermoplastic resin composition of Example 2 having the same flame retardant content.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:

about 100 parts by weight of a polycarbonate resin;

about 20 parts by weight to about 130 parts by weight of flat glass fibers, the glass fibers being coated with an epoxy compound;

about 0.5 parts by weight to about 3 parts by weight of a modified polyolefin comprising a repeat unit represent by Formula 1 and a repeat unit represented by Formula 2:

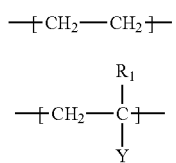

[Formula 1]

[Formula 2]

where $R_1$ is a hydrogen atom or a methyl group, and Y is —$COOR_2$, a glycidyl-modified ester group, an arylate group, or a nitrile group, wherein $R_2$ of —$COOR_2$ is a $C_1$ to $C_{12}$ alkyl group;

about 5 parts by weight to about 20 parts by weight of a phosphazene compound; and about 0.1 parts by weight to about 5 parts by weight of a fluorinated olefin resin;

wherein the thermoplastic resin composition has a notched Izod impact strength of about 10 kgf·cm/cm to about 20 kgf·cm/cm, as measured on a ⅛" thick specimen in accordance with ASTM D256; a flexural strength of about 55,000 kgf/cm$^2$ to about 165,000 kgf/cm$^2$, as measured on a 3.2 mm thick specimen at a flexural rate of 2.8 mm/min in accordance with ASTM D790; and a flame retardancy of V-0 or higher, as measured on a 0.75 mm or 1.0 mm thick specimen by the UL-94 vertical burning test.

2. The thermoplastic resin composition according to claim 1, wherein the glass fibers are flat chop-strand glass fibers coated with an epoxy group-containing compound and having a cross-sectional aspect ratio of about 2 to about 6.

3. The thermoplastic resin composition according to claim 2, wherein the modified polyolefin comprises about 50 wt % to about 95 wt % of the repeat unit represented by Formula 1 and about 5 wt % to about 50 wt % of the repeat unit represented by Formula 2.

4. The thermoplastic resin composition according to claim 1, wherein the phosphazene compound is a compound represented by Formula 3:

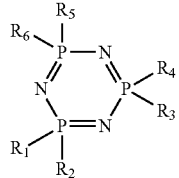

[Formula 3]

wherein $R_1$, $R_2$, $R_3$, $R_4$, $R_5$, and $R_6$ are each the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

5. The thermoplastic resin composition according to claim 1, wherein the fluorinated olefin resin comprises polytetrafluoroethylene, polyvinylidene fluoride, a tetrafluoroethylene/vinylidene fluoride copolymer, a tetrafluoroethylene/hexafluoropropylene copolymer, an ethylene/tetrafluoroethylene copolymer, and/or a mixture obtained by aggregating a polytetrafluoroethylene emulsion with a styrene-acrylonitrile emulsion.

6. The thermoplastic resin composition according to claim 1, wherein a weight ratio of the glass fibers to the modified polyolefin ranges from about 15:1 to about 60:1.

7. The thermoplastic resin composition according to claim 1, wherein Y of Formula 2 is —$COOR_2$.

8. A molded article formed of the thermoplastic resin composition according to claim 1.

* * * * *